United States Patent [19]

Buckmaster et al.

[11] Patent Number: 5,610,203
[45] Date of Patent: Mar. 11, 1997

[54] FOAMABLE FLUOROPOLYMER COMPOSITION

[75] Inventors: Marlin D. Buckmaster, Vienna, W. Va.; Stuart K. Randa, Wilmington, Del.

[73] Assignee: E. I. Du Pont de Nemours and Company, Wilmington, Del.

[21] Appl. No.: 631,765

[22] Filed: Apr. 10, 1996

[51] Int. Cl.⁶ .................................................. C08J 9/00
[52] U.S. Cl. ................... 521/85; 521/79; 521/89; 521/143; 521/145
[58] Field of Search ...................... 521/79, 85, 89, 521/145, 143

[56] References Cited

U.S. PATENT DOCUMENTS

| | | | |
|---|---|---|---|
| 3,072,583 | 1/1963 | Randa | 521/145 |
| 4,764,538 | 8/1988 | Buckmaster et al. | 521/85 |
| 4,877,815 | 10/1989 | Buckmaster | 521/85 |
| 5,023,279 | 6/1991 | Buckmaster et al. | 521/85 |

*Primary Examiner*—Morton Foelak

[57] ABSTRACT

An improved foam nucleation system based on selected boron nitride provides smaller foam cell size for melt-fabricable fluoropolymers.

6 Claims, 1 Drawing Sheet

— 2.00μ

— 2.00μ

FOAMABLE FLUOROPOLYMER COMPOSITION

FIELD OF THE INVENTION

This invention is in the field of foamed fluoropolymers, providing an improved nucleation system for foaming of melt-fabricable fluoropolymer resins.

BACKGROUND OF THE INVENTION

Conductive wire is often used to transmit electronic signals. The wire must be protected, or insulated, and thermoplastic coatings extruded from a molten state onto and around the wire are ordinarily used for this purpose. The thermoplastic materials are selected on the basis of several criteria including high dielectric strength, low dielectric constant, and low dissipation factor. It has previously been found that if the thermoplastic material is foamed as it is applied to the wire, the dielectric constant is desirably reduced due to the formation of numerous small non-interconnected cells in the foam. U.S. Pat. No. 3,072,583 discloses a nucleated foaming process for extruding perfluorinated polymer foam around transmission wire with a dissolved gas blowing agent. It is also known to foam molten resin with gas either injected under pressure or released by chemical agents incorporated in the resin. Foamed insulation using other thermoplastic materials, especially polyolefins, is also widely known.

Foams are also useful in applications other than wire insulation. Examples include foamed sheet for electrical insulation, thermal insulation, and cushioning; foamed pipe and tubing; and injection molded pieces.

A nucleating agent is needed in the foaming process to achieve a uniform, small cell structure. A preferred art-recognized nucleating agent for fluoropolymer resins is boron nitride (BN), an inert white ceramic powder. A 0.5–2.0 wt % loading of BN when used alone is normally used to provide foam cell nucleation.

U.S. Pat. No. 4,764,538 discloses synergistic combinations of BN and certain inorganic salts which give greatly enhanced foam nucleation in fluoropolymers. This combination not only allows a significant reduction in the amount of BN needed but also gives improved foam in terms of smaller cells. Improved capacitance uniformity and dimensional uniformity are also attained.

U.S. Pat. No. 4,877,815 discloses sulfonic and phosphonic acids, and salts of the acids, which give very efficient foam cell nucleation in a wide variety of thermoplastic materials at low concentrations. Additionally, as disclosed therein, these acids and salts are beneficially used in conjunction with BN. As additionally disclosed therein, these acids and salts are also beneficially used in conjunction with BN and calcium tetraborate together, i.e., a combination covered by U.S. Pat. No. 4,764,538.

U.S. Pat. No. 3,072,583 states a preference for BN having an average particle size of less than 10 μm. U.S. Pat. Nos. 4,764,538 and 5,023,279 characterize the BN used therein as having surface areas, respectively, of about 8 $m^2/g$ and 8.6 $m^2/g$. Japanese patent application publication 59-011340 (1984) discloses that BN is most effective as a blowing coagent (foam nucleating agent) for fluorinated resin if BET surface area is 5–10 $m^2/g$.

Various grades of BN heretofore used as foam nucleating agents are available from manufacturers such a Carborundum and Advanced Ceramics. It is believed that such BN grades are produced by processes that involve comminuting relatively large crystals and aggregates of crystals that result from crystal growth, to obtain powders having desired average particle size. Electron micrographs of powder samples show that such particles are generally irregular, with jagged edges, and indicate the presence of very small particles. See FIG. 2.

Further improvement in foaming efficiency, e.g., reduction in foam cell size and improvements in capacitance uniformity and dimensional uniformity, are desired. This is especially so for smaller wire constructions of interest in the electronics field, so that, for example, foam cell dimensions will be small with respect to the radial dimension of the thin insulation.

SUMMARY OF THE INVENTION

This invention provides an improved foamable fluoropolymer resin composition containing an improved boron nitride. The composition also contains (a) at least one inorganic salt containing a polyatomic anion, or (b) at least one sulfonic or phosphonic acid or salt of the acid, or (c) a combination of (a) and (b). The improved boron nitride is obtained as crystal platelets, generally rounded, that have been grown to final size and have been deagglomerated without milling. Use of the improved boron nitride in the foam nucleating agent system leads to substantially reduced foam cell size.

This invention also provides a concentrate containing the improved boron nitride, that can be diluted for use in the foamable composition of the invention.

In another aspect, the invention provides an improved process for foaming thermoplastic resin, wherein the improvement comprises using the improved boron nitride nucleating agent as described above.

DETAILED DESCRIPTION

It has been discovered that the foaming of fluoropolymer resins can be improved if a foam cell nucleating agent comprising boron nitride (BN) crystalline platelets that have been grown to essentially final size is used. Such BN platelets are primarily whole crystals and are generally rounded, rather than irregularly jagged as generally obtained when BN particles are obtained by comminuting larger structures. Surprisingly, the improvement does not reside uniquely either in reduced particle size or in increased surface area of the BN platelets. Relative to prior-art BN particles, the rounded platelets used in the present invention provide improved foaming at the same, or even slightly larger, particle size despite lower surface area.

Figure 1:
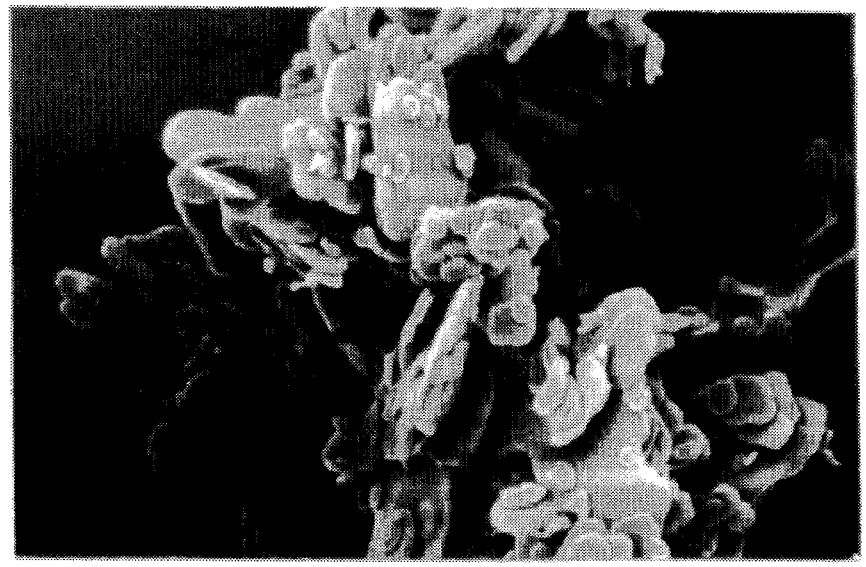
FIG. 1 is an electron micrograph of a boron nitride powder used as a nucleating agent of this invention. The micrograph shows the rounded edges of crystals grown to final dimensions. The scale is indicated by the 2 μm bar.
Figure 2:
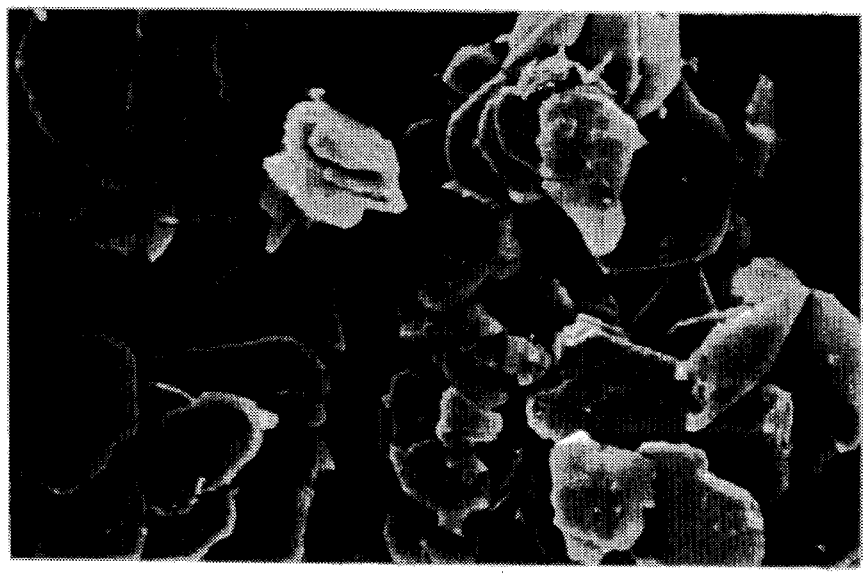
FIG. 2 is an electron micrograph of a boron nitride powder for which the dimensions were obtained by comminuting larger structures, showing the jagged edges resulting from comminution. The presence of very small particles (fines) is also evident. The scale is indicated by the 2 μm bar.

The BN used in this invention was developed for the cosmetics industry and is in the form of crystallites grown essentially to final dimensions as rounded platelets by proprietary processes of the manufacturers (e.g., Carborundum). If agglomeration of individual crystallites occurs during crystal platelet growth, they are not deagglomerated by milling. Deagglomeration, if necessary, is by a technique proprietary to the manufacturer that essentially preserves the integrity of the individual crystallite, rather than by mechanical comminution that can break up individual crystals as well as aggregates and produce fines in the resultant powder. Thus, the BN crystals used in the present invention are in the form of particles without having been comminuted to form the particles. Since the crystals are not violently treated, the edges of the crystals are believed to remain generally undisturbed so that the crystals have a smooth rounded appearance. This is shown in FIG. 1. Consequently, the surface area of the BN is relatively low at any particular particle size because the smooth edges of the crystallites are not disturbed by mechanical action and fines are not generated. This BN can have average particle size of at least 1 μm and up to about 12 μm, preferably 2–8 μm. BN so obtained and having recited particle size generally has surface area in the approximate range 2–25 $m^2/g$. Such boron nitride powder is available commercially, for example, under the trademark TRES BN™ (The Carborundum Company). Suitable Carborundum grades include XP-3008, XP-3004 and XP-3002. For illustration, the platelets of grade HP-3008 have nominal mean size of about 8 μm and surface area of about 3 $m^2/g$.

BN powder prepared as described above, that is, deagglomerated without milling, can contain a minor fraction of relatively large particles, believed to be residual agglomerates of smaller crystals. As shown in Examples 7–10 below, the foam nucleating performance of such BN can be enhanced by milling subsequent to deagglomeration without milling.

The foamable fluoropolymer resin composition of this invention containing improved boron nitride also contains (a) at least one inorganic salt containing a polyatomic anion, or (b) at least one sulfonic or phosphonic acid or salt of the acid, or (c) a combination of (a) and (b).

The inorganic salts that can be used in this invention include those disclosed in U.S. Pat. No. 4,764,538. Briefly, they are inorganic salts stable at the temperature of fluoropolymer extrusion, having metal cations, having polyatomic anions, and satisfying the following relationship:

$$0.36[14-pKa]-0.52>[r-0.2q]^2>0.11[14-pKa]-0.28$$

wherein:
r=crystal ionic radius of the cation, in angstrom units
q=valence of the cation
pKa=–logKa
Ka=equilibrium ionization constant of the anion acid.
Crystal ionic radius values and pKa values can be found in CRC Handbook of Chemistry and Physics, 67th Edition published by CRC Press, Inc. (1986), page F-157 for ionic radius and page D-163 for pKa values. Suitable inorganic salts include sodium carbonate, lithium carbonate, potassium sulfate, and the tetraborates of sodium, potassium, and calcium. Tetraborate is a preferred polyatomic anion.

The sulfonic and phosphonic acids, and salts thereof, that can be used in this invention include those disclosed in U.S. Pat. No. 5,023,279. Such compounds include the free acids and salts of partially or totally fluorinated aliphatic sulfonic and phosphonic acids, which optionally may contain cycloalkyl groups and/or ether oxygen, and the free acids and salts of aromatic sulfonic and phosphonic acids in which the aromatic ring, optionally, is substituted with alkyl, fluorine-containing alkyl, and/or hydroxyl groups. Preferred compounds include those having the formula $$[Z(CF_2)_x(CF_2CFX)_p(R')_y(CH_2)_zRO_3]_nM$$

wherein:
the bivalent groups, except for $RO_3$, may be present in any sequence;
Z is $CCl_3$, $CCl_2H$, H, F, Cl or Br;
each X, independently, is selected from H, F, Cl and $CF_3$;
R is selected from sulfur and phosphorus;
M is selected from H and a metallic, ammonium, substituted ammonium and quaternary ammonium cation;
each of x and z, independently, is an integer and is 0 to 20;
p is an integer and is 0 to 6;
y is 0 or 1;
x+y+z+p is a positive integer, or, if x+y+z+p is 0, then Z is $CCL_3$ or $CCl_2H$;
n is the valence of M; and
R' is selected from a C5-6 perfluorinated alicyclic ring diradical; a $C_{1-16}$ perfluorinated aliphatic polyether diradical with repeat units selected from $[CF_2O]$, $[CF_2CF_2O]$, and $[CF_2CF(CF_3)O]$; and a substituted or unsubstituted aromatic diradical, in which case Z is H.

Suitable such compounds include the potassium, barium, and calcium salts of perfluoroalkane sulfonic acids and perfluoroalkyl ethane sulfonic acids, in both of which the perfluorinated group contains 1–10 carbon atoms.

The fluoropolymer resins useful in the present invention include all such resins that can be foamed by a gas injection process and/or by use of a chemical blowing agent. Such foaming processes are described in the prior art. See, for example, U.S. Pat. Nos. 4,764,538 and 5,023,279.

More specifically, the fluoropolymer resins useful in the present invention are organic polymeric compounds containing at least 35 wt % fluorine and are melt fabricable. As such, they generally have a melt flow rate (MFR) of about 1–100 g/10 min as measured according to ASTM D-1238 at the temperature appropriate to each resin. Preferred MFR is in the range 5–25 g/10 min.

Preferred examples of such fluoropolymers are:
(a) homopolymers of chlorotrifluoroethylene (CTFE), 2,2-difluoroethylene, or vinylidene fluoride, or
(b) copolymers of tetrafluoroethylene (TFE) and one of the monomers in (a), or
(c) copolymers of at least one of the monomers in (a) or (b) and one or more monomers selected from the group consisting of ethylene (E), terminally unsaturated perfluoroolefins having 3–8 carbon atoms, perfluoro(alkyl vinyl ethers) (PAVE) having 3–8 carbon atoms, perfluoro(alkoxy alkyl vinyl ether) having 5–12 carbon atoms, and perfluoroalkyl ethylene having 3–8 carbon atoms.

Especially preferred fluoropolymers are the copolymers TFE/hexafluoropropylene, optionally including one or more additional monomers; TFE and at least one perfluoro(alkyl vinyl ether) selected from perfluoro(methyl vinyl ether), perfluoro(ethyl vinyl ether), and perfluoro(propyl vinyl ether); E/TFE including E/TFE/perfluorobutyl ethylene; E/CTFE; and polyvinylidene fluoride.

Fluoropolymer resin, BN, and inorganic salt can be combined in several ways to achieve foamable compositions or concentrates that can be diluted to foamable compositions. For example, fluoropolymer resin in powder or cube form, salt, and BN can be dry blended in desired proportions and melt extruded to obtain a compounded composition. Alternatively, individual concentrates of inorganic salt in fluoropolymer and of BN in fluoropolymer can be blended with fluoropolymer and then extruded to the desired composition. Thus, one aspect of the present invention is a concentrate composition comprising melt-fabricable fluoropolymer resin and the improved BN of this invention. In the foregoing case, the fluoropolymer used in the three components of the blend will normally be the same, but can be different if the different fluoropolymers are compatible. Alternatively, the salt in powder form can be combined with a BN concentrate and the fluoropolymer. Alternatively, one component of the nucleating agent system can first be incorporated into the fluoropolymer by extrusion, and then the second component of the nucleating agent system can be added. And so on.

The same alternatives are available for preparing foamable compositions and concentrates of fluoropolymer, BN, and sulfonic or phosphonic acid or salt thereof. Similar alternatives are available for preparing foamable compositions and concentrates of fluoropolymer, inorganic salt, sulfonic or phosphonic acids or salt thereof, and BN, with an increased number of options accompanying the increase in number of ingredients.

The concentrations of BN and inorganic salt and/or sulfonic or phosphonic acid or salt will be in effective foam cell nucleating amounts that will depend on the foam structure being produced, the specific resin being used, and the salt(s) or acid(s) chosen. For the foamable fluoropolymer compositions of this invention, a BN concentration in the range 0.02–2 wt % based on the combined weight of polymer resin and BN is normally used. Concentrations of 0.1–0.5 wt % can be satisfactory, especially in resins such as TFE/PPVE or TFE/HFP copolymers, for which 0.1–0.35 wt % is especially preferred. Polymers with lower melt density, e.g., copolymers of ethylene with TFE or chlorotrifluoroethylene, will normally require higher BN levels, such as 0.5–1 wt %. More than one grade of BN can be used, with combined concentrations as recited above, but generally a single grade is used.

Each inorganic salt has an optimal concentration mainly in the range 25–1000 ppm by weight, based on combined weight of polymer resin and BN, and generally 50–500 ppm at 0.25 wt % BN. The concentration of sulfonic or phosphonic acid or salt thereof is generally 25–5000 ppm, based on combined weight of polymer resin and BN, and preferably 50–500 ppm. More than one type of inorganic salt and/or sulfonic or phosphonic acid or salt thereof can be used, with combined concentrations as recited above, but generally a single type in each category selected for the particular foam nucleating agent system is used.

When a concentrate composition is prepared, the concentrations of BN and any other component(s) of the foam nucleating agent system present in the concentrate are usually some multiple of the concentrations recited above. It is convenient to make concentrates with concentration of nucleating agent 10×the concentration desired for the foamable composition, in which case one part of the concentrate is blended with nine parts of natural resin, i.e., resin containing no nucleating agent. Thus, for example, BN concentration in a concentrate might conveniently be 0.5–10 wt %. While the natural resin should at least be compatible with the resin used in the concentrate, it need not have the same chemical composition or be of the same grade. However, it is common to use a natural resin of the same grade used as the matrix for the concentrate.

The foamable fluoropolymer compositions of this invention are useful for making improved foam structures, especially foamed wire insulation. Such foam structures are another aspect of this invention.

EXAMPLES

Foamable fluoropolymer resin concentrate compositions used in the following examples were prepared by combining resin pellets and additives in desired proportions in a polyethylene bag, blending well by shaking and kneading by hand, and then extruding on a 28-mm Werner & Pfleiderer twin screw extruder with a strand cutter to pelletize. The concentrate pellets were blended with pellets of natural fluoropolymer resin in desired proportions and the pellet blend was fed to the wire coating extruder hopper. Concentrations of additives are calculated and expressed based on combined weight of fluoropolymer resin and BN, and are given based on the foamable extrusion composition. The concentrations of additives in concentrates were generally 10×the concentrations in the extrusion compositions, so the ratio of natural resin to concentrate was 9/1.

Fluoropolymer resins and additives for foamable extrusion composition concentrates, or an extrusion composition at final foaming concentration in one instance, for the Examples and Controls are identified in Table 1. Unless otherwise stated, when a foamable extrusion composition concentrate was prepared, a different lot of the same fluoropolymer resin grade was always employed to let down (dilute) the concentrate to a foamable extrusion composition. No further note of this fact is made herein, unless it is appropriate to distinguish between lots used for dilution. MFR values given in the individual examples are for the natural resin used, i.e., for the major resin component of the foamable extrusion composition. For BN grades, nominal properties are given in Table 1. Measured property values provided by the supplier are given in individual Examples. Generally, surface area was determined by the BET nitrogen adsorption method, and particle size was determined with a Microtrac™ particle analyzer (Leeds & Northrup Co.). The average particle size reported in the examples is the volume average particle size.

TABLE 1

| Code | Fluoropolymer Resins and Nucleating Agents Identification or Description |
|---|---|
| FEP | Copolymer of TFE and HFP, ASTM D-2116 Type I (Teflon ® FEP fluoropolymer resin grade 100, DuPont). |
| PFA | Copolymer of TFE and PPVE having nominal melting temperature of 305° C. by DSC, prepared generally according to European Patent 271,243. |
| SHP-325 | Milled BN (Carborundum) |
| UHP-500 | Milled BN (Carborundum) |
| HCV | Milled BN (Union Carbide, now Advanced Ceramics) |
| XP-3008 | Unmilled BN having nominal particle size of 8 μm and BET surface area of about 3 m²/g (Carborundum). |
| XP-3004 | Unmilled BN having nominal particle size of 4 μm and BET surface area of about 6 m²/g (Carborundum). |
| XP-3002 | Unmilled BN having nominal particle size of 2 μm (Carborundum). |
| CaTB | Calcium tetraborate. |
| BaS-10 | Barium salt of a mixture of perfluoroalkyl ethane sulfonic acids (CAS No. IC3-56-0). |

In the following examples the foaming process was a continuous gas injection foaming process carried out using nitrogen as the blowing agent. Other known blowing agents could be used to give substantially the same results. Both high-pressure (see U.S. Pat. No. 3,975,473, for example) and low-pressure gas injection were used. Primarily, a Nokia-Maillefer 60-mm extrusion wire line was used in a melt draw extrusion technique. Other extruders, e.g., by Entwistle, can be substituted. The extruders, all having length/diameter ratio of 30/1, were equipped with screws designed for foaming operations. Extruder screw design allowed for the gas injection and had a mixing torpedo (U.S. Pat. No. 3,006,029) to provide a uniform melt. Details of the extruders, screw designs and extrusion conditions are given in Table 2. Step down dies and guide tips of the type listed for Conditions IV were described in "Extrusion Foaming of Coaxial Cables of Melt Fabricable Fluorocarbon Resin" (S. K. Randa, 30th International Wire & Cable Symposium, 1981. See FIG. 10.) Wire sizes in Table 2 are given in AWG. AWG 22 has diameter of 0.025 inch (0.64 mm). AWG 33 has diameter of 0.007 inch (0.18 mm).

As well known to those skilled in the art, foaming results vary with equipment, extrusion conditions, and foaming method as well as with resin, nucleating agent, and nucleating agent concentration. Thus, it is possible for poor results in one set of tests to be better than good results in another set of tests. This is seen in the Examples and Controls below.

TABLE 2

Extruder Detail and Extrusion Conditions

|  | I | II | III | IV |
|---|---|---|---|---|
| Extruder |  |  |  |  |
| Type | N-M | N-M | N-M | Ent |
| Size (mm) | 60 | 45 | 45 | 31.8 |
| Die diameter (mm) | 5.79 | 4.31 | 4.22 | 1.02 step |
| Guide tip diameter (mm) | 1.91 | 1.91 | 1.91 | 0.46 step |
| Screw flights/depth (mm) |  |  |  |  |
| Feed zone | 12/11.4 | 10/8.3 | 10/8.3 | 8.8/5.97 |
| Transition | 3/— | 3/— | 3/— | 3/— |
| Metering zone | none | 4/3.1 | 4/3.1 | 4/2.41 |
| Transition | — | — | — | — |
| Mixing/gas zone | none | 4/5.1 | 4/5.1 | 4/3.81 |
| Transition | — | — | — | — |
| Pumping zone | 5/3.8 | 6/2.8 | 6/2.8 | 4/2.16 |
| Mixing zone | 10/7.1 | 4/5.1 | 4/5.1 | 4/3.81 |
| Temperatures (°C.) |  |  |  |  |
| Rear | 368 | 368 | 363 | 343 |
| Center rear | 385 | 377 | 366 | 360 |
| Center | 385 | 385 | 366 | 360 |
| Center front | 391 | 385 | 366 | 363 |
| Front | 391 | 396 | 366 | 366 |
| Clamp | 371 | 396 | 343 | 371 |
| Adapter | 362 | 393 | 329 | 371 |
| Crosshead | 357 | 393 | 316 | 382 |
| Die | 385 | — | 313 | — |
| Melt | 391 | 399 | 357 | — |
| Wire preheat | 76 | 65 | 75 | 121 |
| Running conditions |  |  |  |  |
| Screw speed (rpm) | 15 | 24.4 | 17.4 | 4 |
| Nitrogen pressure (MPa) | 34.6 | 20.8 | ~24 | 38.0 |
| Crosshead pressure (MPa) | 15.8 | ~11.3 | ~14.5 | ~9.2 |
| Vacuum on x-head (mm Hg) | slight | slight | slight | 25 |
| Wire size (AWG) | 22 | 22 | 22 | 33 |
| Wire speed (m/min) | 112 | 74 | 45 | 9 |
| Melt cone length (mm) | 18 | 13 | 25 | 5 |
| Air gap to water quench (m) | 9 | 12 | 12 | 8 |

Foam extrudate was characterized as follows. Capacitance and diameter of the foamed wire insulation were measured and recorded using the in-line monitoring devices with which Nokia-Maillefer extrusion lines are equipped. Values given below are the average values and the average amplitudes of variation estimated from the strip chart record. Dielectric constant was calculated from average capacitance and average wire dimensions. In turn, void fraction was calculated from calculated dielectric constant and the known dielectric constants of air and the fluoropolymer resin used. Average foam cell size was determined at radial mid-wall of the foamed wire insulation by visual examination under a microscope equipped with a vernier eyepiece or by taking a photograph of a thin section of the foam at 25–40×magnification and measuring cell size on the photograph.

EXAMPLE 1 AND CONTROLS A–B

FEP having MFR of 6.9 g/10 min was used on the 60-mm extrusion line with high-pressure gas injection, using conditions I of Table 2. The nucleating agent system was 0.25 wt % of BN and 110 ppm of calcium tetraborate. The various grades of BN used are identified and characterized in Table 3. Results are also summarized in Table 3. These results show the advantage of using BN that has been deagglomerated without milling to achieve smaller cell size, despite the BN having lower surface area at comparable average particle size.

TABLE 3

BN and Extrusion Results for Example 1 & Controls A–B

| Example | 1 | A | B |
|---|---|---|---|
| Boron nitride |  |  |  |
| Type | XP-3008 | SHP-325 | HCV |
| BET surface area (m$^2$/g) | 3.3 | 7.2 | 28.2 |
| Ave. particle size (μm) | 7.6 | 6.3 | 5.3 |
| Extrudate properties |  |  |  |
| Foam diameter (mm) | 2.42 ± 0.03 | 2.42 ± 0.03 | 2.49 ± 0.05 |
| Capacitance (pF/m) | 59.7 ± 0.23 | 59.7 ± 0.23 | 61.7 ± 0.23 |
| Dielectric constant | 1.42 | 1.43 | 1.50 |
| Ave. foam cell size (mm) | 0.076 | 0.15 | 0.28 |
| Voids (%) | 53 | 52 | 46 |
| Extrusion stability | good | good | fair |
| Surface quality* | C to S | C to S | C |

*C = coarse, S = smooth

EXAMPLES 2–3 AND CONTROL C

FEP having nominal MFR of 7 g/10 min was used on the 45-mm extrusion line with high-pressure gas injection, using conditions II of Table 2 except that wire speed was 219 R/min (67 m/min) for Control C, about 10% slower than for Examples 2 & 3. This difference was necessary to maintain the nominal extrudate target diameter and capacitance, because of the superior nucleating efficiency of the nucleating agents in the foamable compositions of Examples 2 & 3. The nucleating agent system was 0.25 wt % of BN and 110 ppm of calcium tetraborate. The various grades of BN used are identified and characterized in Table 4. Results are also summarized in Table 4. These results show the advantage of using BN that has been deagglomerated without milling to obtain foamed extrudate having smaller foam cell size and higher void fraction, with BN at comparable surface area. While all of the BN types used in this set of tests have surface area within the 5–10 m$^2$/g range of Kokai 59-011340 cited above, the BN of the present invention provides a higher void fraction and much smaller (less than half the diameter) foam cell size.

TABLE 4

BN and Extrusion Results for Examples 2–3 & Control C

| Example | 2 | 3 | C |
|---|---|---|---|
| Boron nitride |  |  |  |
| Type | XP-3004 | XP-3002 | UHP-500 |
| BET surface area (m$^2$/g) | 6.1 | 9.7 | 7.1 |

TABLE 4-continued

BN and Extrusion Results for Examples 2–3 & Control C

| Example | 2 | 3 | C |
|---|---|---|---|
| Ave. particle size (μm) | 4.7 | 3.5 | 6.3 |
| Extrudate properties | | | |
| Foam diameter (mm) | 2.45 ± 0.025 | 2.29 ± 0.025 | 2.40 ± 0.020 |
| Capacitance (pF/m) | 54.1 ± 0.16 | 59.2 ± 0.33 | 59.0 ± 0.66 |
| Dielectric constant | 1.32 | 1.35 | 1.40 |
| Ave. foam cell size (mm) | 0.036 | 0.036 | 0.089 |
| Voids (%) | 63 | 60 | 54 |
| Extrusion stability | good | good | good |
| Surface quality | smooth | smooth | rough |

EXAMPLES 4–5

PFA resin having MFR of 28 g/10 min is used in the Entwistle extruder for foaming with high-pressure gas injection, using conditions IV of Table 2. Additionally, a skin of solid PFA having MFR of 50 g/10 min is applied over the foam using an Enwistle 1-inch (25.4 mm) side extruder having length/diameter ratio of 20/1 in a foam/skin technique similar to that disclosed in U.S. Pat. No. 4,711,811. The nucleating agent system is 0.125 wt % of BN, 55 ppm of CaTB, and 45 ppm of BaS-10. The various grades of BN are identified and characterized in Table 5. Using these conditions, the extrudate properties shown in Table 5 are expected. The use of BN that has particles essentially as produced by crystal growth, and not as produced by comminution, achieves smaller cell size despite having lower surface area.

TABLE 5

BN and Extrusion Results for Examples 4–5

| Example | 4 | 5 |
|---|---|---|
| Boron nitride | | |
| Type | XP-3004 | XP-3002 |
| BET surface area (m$^2$/g) | 6.1 | 9.5 |
| Ave. particle size (μm) | 4.7 | 3.4 |
| Extrudate properties | | |
| Foam diameter (mm) | 0.71 | 0.69 |
| Capacitance (pF/m) | 57.4 | 58.8 |
| Dielectric constant | 1.43 | 1.43 |
| Ave. foam cell size (mm) | 0.015 | 0.025 |
| Voids (%) | 52 | 52 |
| Extrusion stability | good | good |
| Surface quality | smooth | smooth |

EXAMPLES 6–9

FEP resin having MFR of 6.9 g/10 min was foamed on the 45-mm extrusion wire line, using conditions III of Table 2. Such extrusion conditions yield somewhat larger foam cell dimensions than those used in previous examples. The nucleating agent system was 0.25 wt % of BN and 110 ppm of calcium tetraborate. Two different samples of BN grade XP-3002 were used, both as received (identified as X and Y) and after jet-milling (identified as X-jet and Y-jet). As received, these samples contained minor populations of particles in the 6–20 μm size range. The primary effect of milling on the particle size distribution was to eliminate detectable amounts of these large particles, and to somewhat reduce the population of particles in the 3–4 μm size range. Properties of the BN samples are given in Table 6, along with the extrusion foaming results. As shown, elimination of the minor population of large particles, believed to be residual agglomerates, by milling of BN which originally had been deagglomerated without milling and perfomed well (see Example 3 ), resulted in substantial improvement as evidenced by significant reduction in foam cell dimensions. The resultant milled deagglomerated BN particles are believed still to be primarily crystals grown to essentially final size.

TABLE 6

BN and Extrusion Results for Examples 6–9

| Example | 6 | 7 | 8 | 9 |
|---|---|---|---|---|
| Boron nitride | | | | |
| Sample | X | X-jet | Y | Y-jet |
| Surface area (m$^2$/g) | 9.7 | 14.2 | 9.2 | 10.7 |
| Ave. particle size (μm) | 3.5 | 1.9 | 3.2 | 1.9 |
| Extrudate properties | | | | |
| Foam diameter (mm) | 2.33 ± 0.02 | 2.33 ± 0.02 | 2.30 ± 0.02 | 2.31 ± 0.01 |
| Capacitance (pF/m) | 59.0 ± 0.66 | 59.7 ± 0.33 | 60.4 ± 0.33 | 59.9 ± 0.33 |
| Dielectric constant | 1.35 | 1.37 | 1.38 | 1.37 |
| Ave. cell size (mm) | 0.22 | 0.13 | 0.30 | 0.13 |
| Voids (%) | 59 | 58 | 57 | 58 |
| Extrusion stability | good | excellent | good | excellent |
| Surface quality | smooth | smooth | smooth | smooth |

We claim:

1. In the process of foaming melt-fabricable fluoropolymer resin in the presence of boron nitride nucleating agent and (a) at least one inorganic salt containing a polyatomic anion, or (b) at least one sulfonic or phosphonic acid or salt of the acid, or (c) a combination of (a) and (b), the improvement comprising carrying out said foaming wherein crystals of said boron nitride have been grown to essentially final size and have an average particle size no more than 12 micrometer.

2. In the process of claim 1, wherein said crystals have been deagglomerated without milling.

3. In the process of claim 2, wherein said deagglomerated boron nitride additionally has been milled.

4. A foamable fluoropolymer composition comprising melt-fabricable fluoropolymer resin, and a nucleating effective amount of boron nitride and (a) at least one inorganic salt containing a polyatomic anion, or (b) at least one sulfonic or phosphonic acid or salt of the acid, or (c) a combination of (a) and (b), wherein the crystals of said boron nitride have been grown to essentially final size and have an average particle size of no more than 12 micrometer.

5. A concentrate composition comprising melt-fabricable fluoropolymer resin and boron nitride, wherein the crystals of said boron nitride have been gown to essentially final size and have an average particle size of no more than 12 micrometer.

6. A foam structure produced by the process of foaming melt-fabricable fluoropolymer resin in the presence of boron nitride nucleating agent and (a) at least one inorganic salt containing a polyatomic anion, or (b) at least one sulfonic or phosphonic acid or salt of the acid, or (c) a combination of (a) and (b), wherein the crystals of said boron nitride have been grown to essentially final size and have an average particle size of no more than 12 micrometer.

* * * * *